(12) United States Patent
Pavlov et al.

(10) Patent No.: US 9,901,978 B2
(45) Date of Patent: Feb. 27, 2018

(54) METHOD AND APPARATUS FOR MOVING MOLTEN METAL

(71) Applicant: Evgeny Pavlov, Krasnoyarsk (RU)

(72) Inventors: Evgeny Pavlov, Krasnoyarsk (RU); Dmitry Ivanov, Krasnoyarsk (RU); Pavel Gasanov, Krasnoyarsk (RU); Andrew Gulayev, Krasnoyarsk (RU)

( * ) Notice: Subject to any disclaimer, the term of this patent is extended or adjusted under 35 U.S.C. 154(b) by 111 days.

(21) Appl. No.: 14/780,796

(22) PCT Filed: Mar. 28, 2014

(86) PCT No.: PCT/IB2014/060273
§ 371 (c)(1),
(2) Date: Sep. 28, 2015

(87) PCT Pub. No.: WO2014/155357
PCT Pub. Date: Oct. 2, 2014

(65) Prior Publication Data
US 2016/0052050 A1    Feb. 25, 2016

(30) Foreign Application Priority Data
Mar. 28, 2013   (GB) .................................. 1305822.7

(51) Int. Cl.
*B22D 11/115*    (2006.01)
*B22D 11/12*     (2006.01)
(Continued)

(52) U.S. Cl.
CPC .......... *B22D 11/115* (2013.01); *B22D 11/122* (2013.01); *B22D 27/02* (2013.01);
(Continued)

(58) Field of Classification Search
CPC ........................... B22D 11/115; B22D 11/122
(Continued)

(56) References Cited

U.S. PATENT DOCUMENTS 5,462,572 A    10/1995   Tallback
6,021,842 A *   2/2000   Bulhoff ................. B22D 11/115
                                                        164/468
(Continued)

FOREIGN PATENT DOCUMENTS

CA      1155630 A    10/1983
CN      1181030 A     5/1998
(Continued)

OTHER PUBLICATIONS

Chinese Office Action dated Oct. 31, 2016 in corresponding Chinese application No. 2014800304594; with English translation (11 pages).
(Continued)

*Primary Examiner* — Kevin E Yoon

(57) ABSTRACT

Methods and apparatus for moving a molten metal are provided in which the electromagnetic inductor includes at least two pairs of electromagnetic pole pairs and in which a first magnetic field component is generated between one pole in a first electromagnetic pole pair and a second pole in a different electromagnetic pole pair, and in which a second magnetic field component is generated between the two poles in one or more electromagnetic pole pairs, the second magnetic field component thereby generating one or more eddy currents in the molten metal. Those eddy currents are generally parallel to the surface of the molten metal and so have greater magnitude and extent that eddy currents perpendicular to the surface. Such eddy currents provide useful additional movement to the molten metal, for instance for stirring purposes, particularly when the depth of molten metal is small.

16 Claims, 16 Drawing Sheets

(51) Int. Cl.
| | |
|---|---|
| *B22D 27/02* | (2006.01) |
| *H05B 6/34* | (2006.01) |
| *F27D 27/00* | (2010.01) |
| *H05B 6/36* | (2006.01) |
| *H02K 44/06* | (2006.01) |
| *H01F 7/20* | (2006.01) |
| *F27D 3/14* | (2006.01) |
| *F27D 3/00* | (2006.01) |

(52) U.S. Cl.
CPC ............... *F27D 3/14* (2013.01); *F27D 27/00* (2013.01); *H01F 7/206* (2013.01); *H02K 44/06* (2013.01); *H05B 6/34* (2013.01); *H05B 6/367* (2013.01); *F27D 2003/0039* (2013.01); *F27D 2003/0054* (2013.01)

(58) Field of Classification Search
USPC .................................................. 164/468, 504
See application file for complete search history.

(56) References Cited

U.S. PATENT DOCUMENTS

| | | | |
|---|---|---|---|
| 6,253,832 B1 | 7/2001 | Hallefält | |
| 6,712,124 B1* | 3/2004 | Yamane | B22D 11/115 164/468 |
| 6,938,674 B2* | 9/2005 | Eriksson | B22D 11/115 164/466 |
| 7,201,211 B2 | 4/2007 | Kunstreich | |
| 8,167,024 B2* | 5/2012 | Kunstreich | B22D 11/115 164/468 |
| 2006/0005939 A1 | 1/2006 | Kunstreich | |

FOREIGN PATENT DOCUMENTS

| | | |
|---|---|---|
| CN | 1211204 A | 3/1999 |
| CN | 1362305 A | 8/2002 |
| EP | 0 013 441 A1 | 7/1980 |
| EP | 0 045 938 A1 | 2/1982 |
| RU | 29592 U1 | 5/2003 |
| RU | 2231904 C2 | 3/2004 |
| RU | 2325245 C2 | 5/2008 |
| WO | 94/03294 A1 | 2/1994 |
| WO | 96/26029 A1 | 8/1996 |
| WO | 97/29874 A1 | 8/1997 |

OTHER PUBLICATIONS

Russian Office Action dated Jan. 19, 2017 in corresponding Russian application No. 2015146402/02; with English translation (20 pages).

International Search Report dated Jul. 23, 2014, issued in corresponding application No. PCT/IB2014/060273 (2 pages).

International Preliminary Report on Patentability dated Sep. 29, 2015, issued in corresponding application No. PCT/IB2014/060273 (7 pages).

* cited by examiner

METHOD AND APPARATUS FOR MOVING MOLTEN METAL

This invention concerns improvements in and relating to apparatus for stirring molten metals and/or methods for stirring molten metals.

Magnetohydrodynamic approaches to the stirring of molten metals are known. A problem has been identified by the applicant with existing approaches for stirring small amounts of molten metal, particularly when present as a shallow depth of molten metal.

The present invention has amongst its potential aims to provide increased stirring of molten metal when present in limited amounts, particularly depths. The present invention has amongst its potential aims to provide an alternative approach to the stirring of molten metals. The present invention has amongst its potential aims to provide improved apparatus for stirring molten metals and/or improved methods for stirring molten metals.

According to a first aspect of the invention there is provided a method for moving a molten metal, the method including:
  a) providing molten metal in a container, the molten metal having a surface which defines a first plane;
  b) providing an electromagnetic inductor, the electromagnetic inductor generating a electromagnetic field in use, a part of the electromagnetic field (magnetic flux) entering the molten metal, wherein the electromagnetic inductor includes at least two pairs of electromagnetic poles;
    the poles in electromagnetic pole pair having a separation from one another in a first direction, the first direction being perpendicular to the first surface; and
    one electromagnetic pole pair having a separation from another electromagnetic pole pair in a second direction, the second direction being parallel to the first plane and being perpendicular to the first direction;
  c) providing a controller for the electromagnetic inductor, wherein the controller controls the current and/or voltage magnitude applied to one or more of the coils of poles in the electromagnetic inductor and the phase of application to one or more of the coils of the poles in the electromagnetic inductor, such that:
    i) a first magnetic field component is generated between one pole in a first electromagnetic pole pair and a second pole in a different electromagnetic pole pair;
    ii) a second magnetic field component is generated between the two poles in one or more electromagnetic pole pairs, the second magnetic field component thereby generating one or more eddy currents in the molten metal, one or more of the eddy currents being generally parallel to the first plane.

The first aspect of the invention may include any of the features, options or possibilities set out elsewhere in this application, including in the other aspects of the invention.

The electromagnetic field is preferably the magnetic flux.

The method may be a method of stirring a molten metal. The method may be a method of moving a molten metal to more evenly distribute energy and/or one or more chemical components within the molten metal.

The molten metal may be aluminum, including alloys thereof.

The container may be provided with a heat source, for instance a furnace, for instance for feeding a casting process. The container may not be provided with a heat source, for instance a holding vessel, for instance for feeding a casting process and/or for instance a transport vessel, such as a ladle. The container may be part of a continuous casting system, for instance the crystallizer.

The molten metal may have a depth within the container, for instance considered perpendicular to the first plane. The depth of molten metal may reduce during dispensing of molten metal to another operation, such as a casting process. The depth of molten metal may increase, for instance during conversion of metal to molten metal, for instance during the start up of a furnace. The depth of the molten metal during a reduced depth phase for the container may be less than 25 cm, perhaps less than 15 cm, optionally less than 10 cm and potentially even less than 5 cm. The depth of the molten metal during the non-reduced depth phase may be greater than 15 cm, for instance greater than 20 cm and potentially greater than 30 cm.

The electromagnetic inductor may have a length, the length extending along a side of the container and extending parallel to the first plane. The electromagnetic inductor may include at least two electromagnetic pole pairs, the pairs being alongside one another. The electromagnetic inductor may include one, two or more electromagnetic pole pairs. Two or more or all of the electromagnetic pole pairs may be of the same design.

The electromagnetic inductor may have a depth, the depth extending perpendicular to the first plane. The apparatus of the invention and/or the method of the invention may be particularly provided when the depth of molten metal in the bath, for instance the maximum depth, is equal to or less than the depth of the inductor.

One or more or all of the electromagnetic pole pairs may be provided with one pole having a maximum separation from the other pole in the first direction, for instance with the first direction being vertical. The maximum separation may be the same for all pole pairs. One or more or all of the electromagnetic pole pairs may be provided with one pole having a maximum separation from the other pole pair in a first direction which is non-vertical.

One or more or all of the electromagnetic pole pairs may be provided such that their poles are aligned with one another in a vertical plane. One or more or all of the electromagnetic pole pairs may be provided with their poles non-aligned with one another in a vertical plane. One or more or all of the electromagnetic pole pairs may be inclined relative to the vertical. One or more or all of the electromagnetic pole pairs may be horizontal. One or more or all of the electromagnetic pole pairs may be provided at an angle between horizontal and vertical.

The electromagnetic pole pairs in different pairs may be provided at the same angle, for instance all vertical. The electromagnetic pole pairs in different pairs may be provided at the same angle inclined relative to the vertical. The electromagnetic pole pairs in different pairs may be provided at the same angle inclined relative to the vertical, but inclined in different directions in one or more cases. The electromagnetic pole pairs in different pairs may be provided at different angle relative to the vertical. For instance one or more may be at or within 10° of the horizontal and one or more may be at or within 10° of the vertical.

One or more of the pole pairs may be formed around a core.

The core may be a C-shaped core. The C-shaped core may include a first element extending in the first direction, the first element connecting a first end element and a second end element together, preferably with each of the first and second end elements extending parallel to the first plane. A coil may be wound around the core, for instance towards one end, ideally on the first end element. A further coil may be wound around the core, for instance towards the other end, ideally on the second end element.

The core may be I-shaped. The I-shaped core may include a first element extending in the first direction, the first element connecting a first en element and a second end element together, preferably with each of the first and second end elements extending parallel to the first plane. A coil may be wound around the core, for instance towards one end, ideally on the first end element. A further coil may be wound around the core, for instance towards the other end, ideally on the second end element.

The core may be an L-shaped core. The L-shaped core may include a first end element extending in the first direction, potentially a second end element extending perpendicular thereto. The first end element may extend parallel to the first plane. A coil may be wound around the core, for instance towards one end, ideally on the first end element. A further coil may be wound around the core, for instance towards the other end, ideally on the second end element.

The core may be provided to the side of the container. The entirety of the core may be provided to the side of the container. One or more parts of the core may be above and/or below the container. One end element of a C-shaped core may be provided above the container and/or one end element of a C-shaped core may be provided below the container. One end element of an L-shaped core may be provided below the container.

The core may be provided between two or more containers. The first magnetic field component and the second magnetic field component from a core, in respect of one or more or all of the cores, may enter two or more of the containers. The core may be provided to a first side of one container and to another side of one or more other containers. One or more parts of the core may be above and/or below the one container and/or one or more other containers.

One or more concentrators for the first magnetic field component and/or the second magnetic field component may be provided.

The inductor may be provided to the side of the container. The entirety of the inductor may be provided to the side of the container. One or more parts of the inductor may be above and/or below the container. One end element of a C-shaped core provided as part of the inductor may be provided above the container and/or one end element of a C-shaped core provided as part of the inductor may be provided below the container. One end element of an I-shaped core provided as part of the inductor may be provided above the container and/or one end element of an I-shaped core provided as part of the inductor may be provided below the container. One end element of an L-shaped core provided as part of the inductor may be provided below the container. One or more or all of the electromagnetic pole pairs may be provided with a separation between themselves and the next electromagnetic pole pair, in which the maximum separation is in the second direction. The maximum separation may be the same between each adjacent pole pair.

The controller may control the current applied to each coil separately. The controller may control the voltage applied to each coil separately. The controller may control the phase applied to each coil separately. The control of the phase may provide for the first magnetic field component.

The first magnetic field component may be provided by the time-phase displacement between adjacent pole pairs. The first magnetic field component may be provided between a first pole, for instance the upper pole, in one pole pair and the other pole, for instance the lower pole, in another pole pair. The pole pairs may be adjacent to each other. The phase may be used to control the orientation and/or position of the first magnetic field component. The phase angle may increase by 90 electrical degrees between one pole and the same pole in an adjacent pair. The phase angle may be 180 electrical degrees greater for the other pole in the same pair.

The first magnetic field component may be provided by feeding an AC power supply with modulated frequency to the coils. The first magnetic field component may be provided by a two or three or multi-phase systems.

The first magnetic field component may thereby generating one or more eddy currents in the molten metal, particularly one or more of the eddy currents being generally perpendicular to the first plane. The one or more eddy currents generally perpendicular to the first plane generated by the first magnetic field component may be smaller than the one or more eddy currents parallel to the first plane generated by the second magnetic field component.

The second magnetic field component may be variable or constant. The second magnetic field component may be provided by the time-phase displacement within one or more of the pole pairs. The second magnetic field component may be provided between a first pole and the other pole for all pole pairs. The second magnetic field component may be the same for each pole pair.

The one or more eddy currents may have a component which is parallel to the first plane. The maximum magnitude for the component for one or more or all of the eddy currents may be parallel to the first plane. One or more of the eddy currents may be generated by one of the pole pairs. Each pole pair may generate an eddy current. The eddy current or currents generated by a pole pair may flux around the magnetic flux between the poles. Each pole pair may generate eddy currents which are parallel to the first plane, eddy currents which are perpendicular to the first plane and eddy currents which are angled intermediate the first plane and perpendicular to the first plane. The eddy currents parallel to the first plane may be those with the greatest magnitude, preferably having a greater magnitude than those perpendicular to the first plane and/or those angled intermediate. The eddy currents parallel to the first plane may have the greatest dimensions and/or extent within the molten metal, preferably having greater dimensions and/or extent that those perpendicular to the first plane and/or angled intermediate.

The eddy currents parallel to the first plane generated by the second magnetic field component may be those with the greatest magnitude, preferably having a greater magnitude than those perpendicular to the first plane and/or any other plane which are generated by the first magnetic field component. The eddy currents parallel to the first plane generated by the second magnetic field may have the greatest dimensions and/or extent within the molten metal, preferably having greater dimensions and/or extent that those perpendicular to the first plane and/or any other plane generated by the first magnetic field component.

One or more eddy currents may be generated by the combination of all the pole pairs. The eddy current or currents generated by the combination of all the pole pairs may flux around the magnetic flux for all the pole pairs.

One or more further eddy currents may be generated in other planes, particularly perpendicular to the first plane. The one or more further eddy currents may have a maximum magnitude which is less than one or more or all of the eddy currents.

According to a second aspect of the invention there is provided a method for moving a molten metal, the method including:
a) providing molten metal in a container;
b) providing an inductor, wherein the inductor includes at least two pairs of magnetic poles;
   the poles in a pole pair having a separation from one another in a first direction; and
   one pole pair having a separation from another pole pair in a second direction, the second direction being different to the first direction;
c) providing a controller for the electromagnetic inductor, wherein the controller controls the current and/or voltage and/or phase applied, such that:
   i) a first magnetic field component is generated which moves the metal in one or more first directions;
   ii) a second magnetic field component is generated which moves the metal in one or more second directions.

Preferably the molten metal has a surface and the surface defines a first plane.

Preferably the method includes providing an electromagnetic inductor. Preferably the inductor includes at least two pairs of magnetic pole pairs. More preferably the electromagnetic inductor includes at least two pairs of electromagnetic pole pairs.

Preferably the poles in a pole pair having a separation from one another in a first direction. Preferably the first direction is perpendicular to the first surface.

Preferably the one pole pair has a separation from another pole pair in a second direction. Preferably the second direction is parallel to the first plane and preferably is perpendicular to the first direction.

Preferably the controller controls the current and/or voltage magnitude applied to one or more of the coils of poles in the inductor and/or the phase of application to one or more of the coils of the poles in the inductor.

Preferably the first magnetic field component is generated between one pole in a first pole pair and a second pole in a different pole pair. The first magnetic field component may provide first directions of movement for the molten metal which are generally parallel to the first plane. The first magnetic field component may provide first directions of movement which are in the same direction as the phase advances in the coils of the inductor.

Preferably the second magnetic field component is generated between the two poles in one or more pole pairs. Preferably the second magnetic field component generates one or more eddy currents in the molten metal. Preferably the one or more of the eddy currents are generally parallel to the first plane. The second magnetic field component may provide second directions of movement which are in the same or different direction to the first directions of movement. The second directions of movement may increase the movement and/or stirring of the molten metal.

The second aspect of the invention may include any of the features, options or possibilities set out elsewhere in this application, including in the other aspects of the invention.

According to a third aspect of the invention there is provided apparatus for moving a molten metal, the apparatus comprising:
a) an electromagnetic inductor, the electromagnetic inductor generating a electromagnetic field in use, a part of the electromagnetic field entering the molten metal, wherein the electromagnetic inductor includes at least two pairs of electromagnetic pole pairs;
   the poles in electromagnetic pole pair having a separation from one another in a first direction; and
   one electromagnetic pole pair having a separation from another electromagnetic pole pair in a second direction, the second direction being perpendicular to the first direction;
c) a controller for the electromagnetic inductor, wherein the controller controls the current and/or voltage magnitude applied to one or more of the coils of poles in the electromagnetic inductor and the phase of application to one or more of the coils of the poles in the electromagnetic inductor, such that, in use:
   i) a first magnetic field component is generated between one pole in a first electromagnetic pole pair and a second pole in a different electromagnetic pole pair;
   ii) a second magnetic field component is generated between the two poles in one or more electromagnetic pole pairs, the second magnetic field component thereby generating one or more eddy currents in the molten metal, one or more of the eddy currents being generally parallel to a first plane, the molten metal having a surface which defines the first plane.

The third aspect of the invention may include any of the features, options or possibilities set out elsewhere in this application, including in the other aspects of the invention.

According to a fourth aspect of the invention there is provided apparatus for moving a molten metal, the apparatus comprising:
a) an inductor, wherein the inductor includes at least two pairs of magnetic pole pairs;
   a. the poles in a pole pair having a separation from one another in a first direction; and
   b. one pole pair having a separation from another pole pair in a second direction, the second direction being different to the first direction
b) providing a controller for the electromagnetic inductor, wherein the controller controls the current and/or voltage and/or phase applied, such that:
   i) a first magnetic field component is generated which moves the metal in one or more first directions;
   ii) a second magnetic field component is generated which moves the metal in one or more second directions.

The fourth aspect of the invention may include any of the features, options or possibilities set out elsewhere in this application, including in the other aspects of the invention.

Various embodiments of the invention will now be described, by way of example only, and with reference to the accompanying drawings in which.

Figure 4:
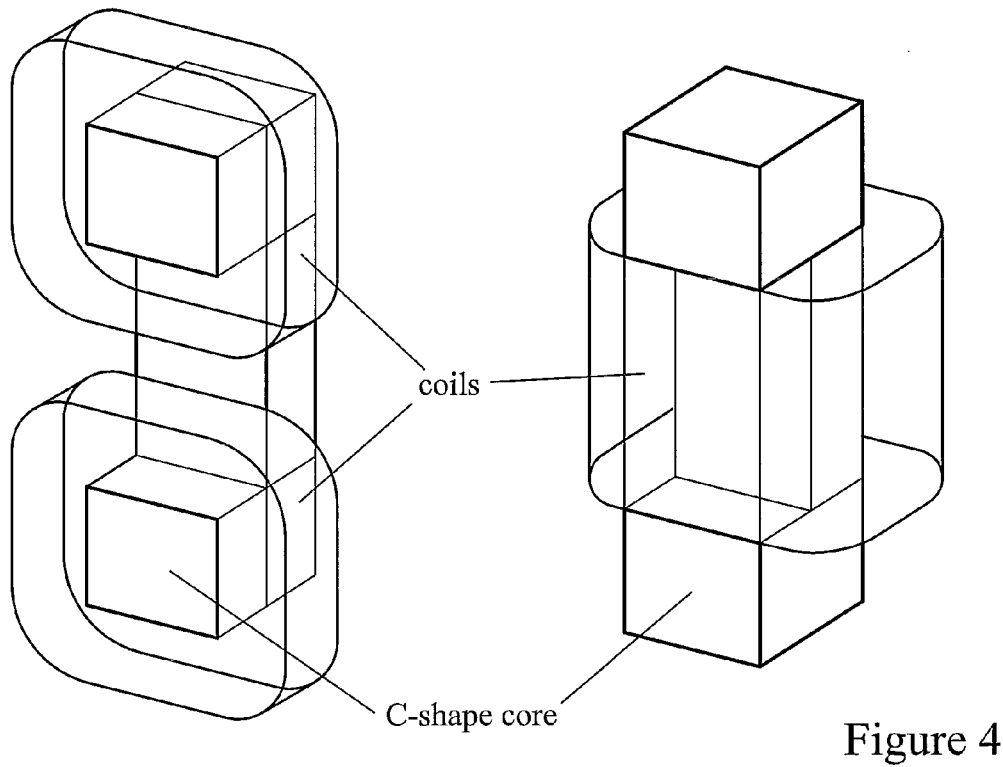
Figure 5:
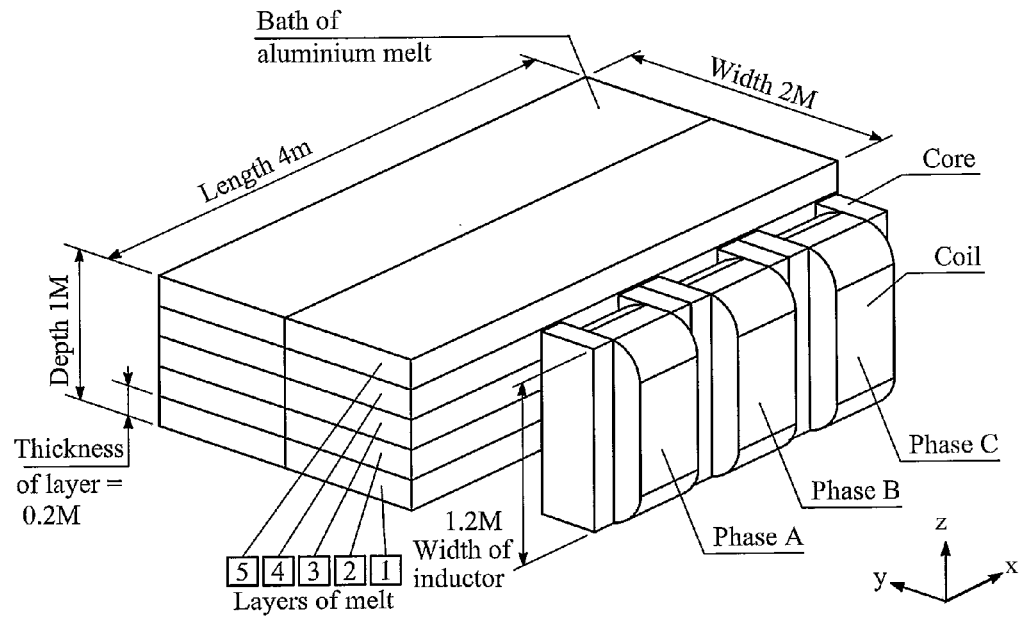
Figure 6:
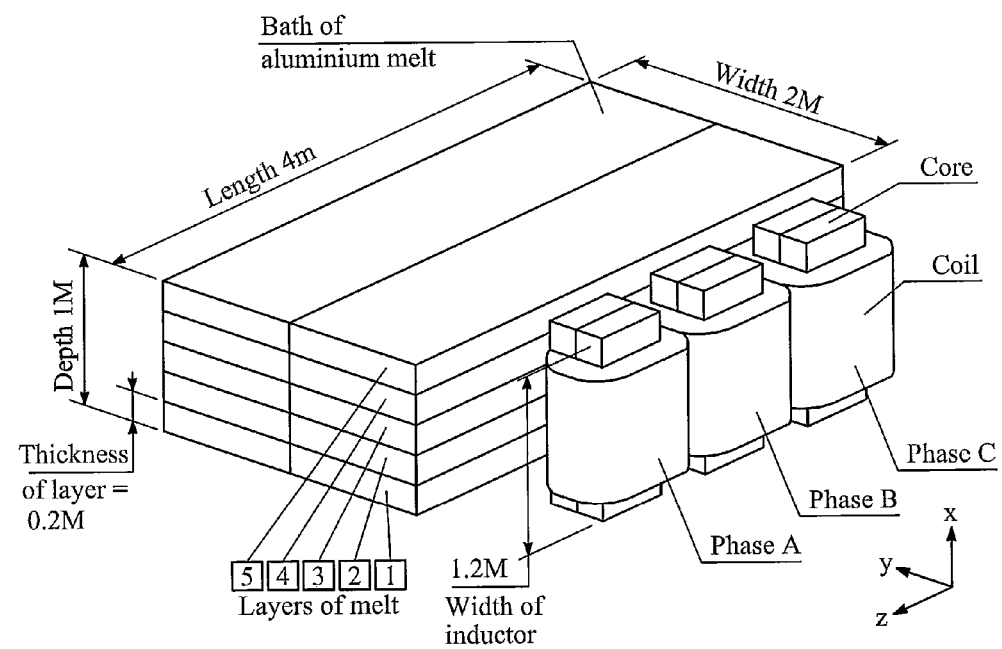
Figure 7:
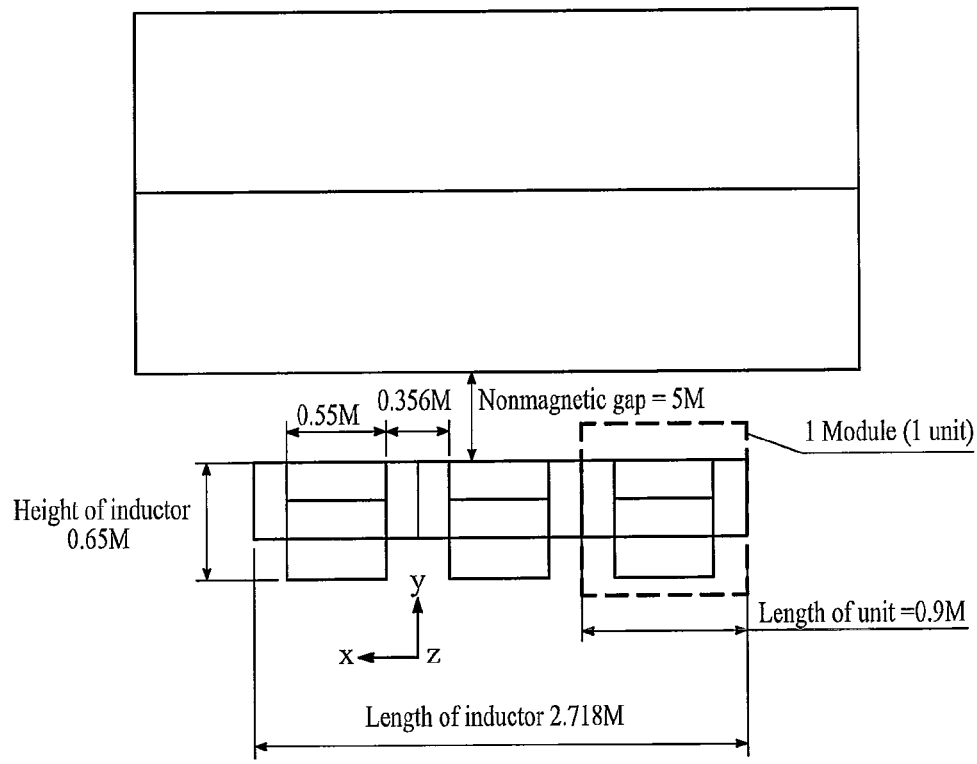
Figure 8:
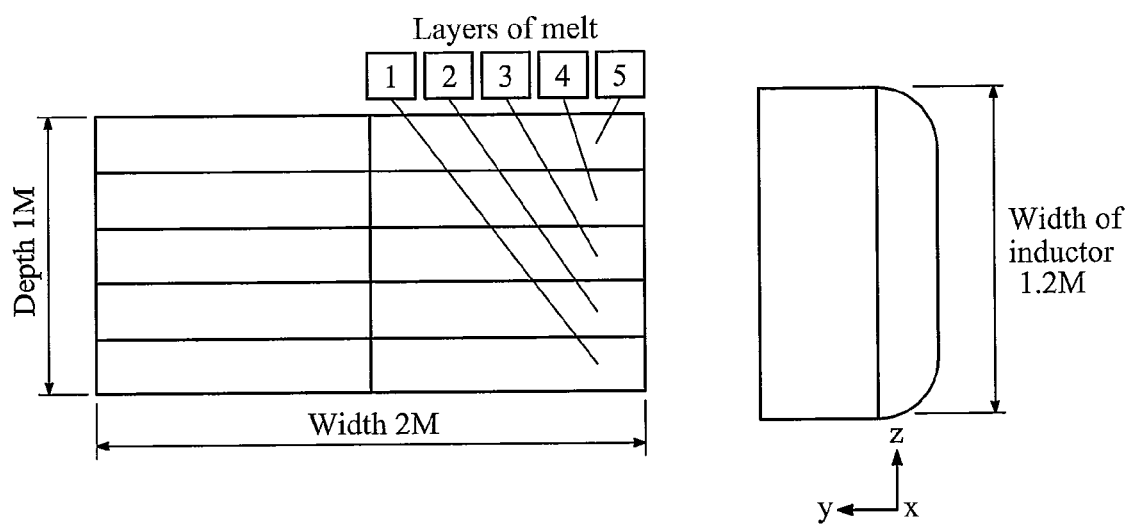
Figure 9:
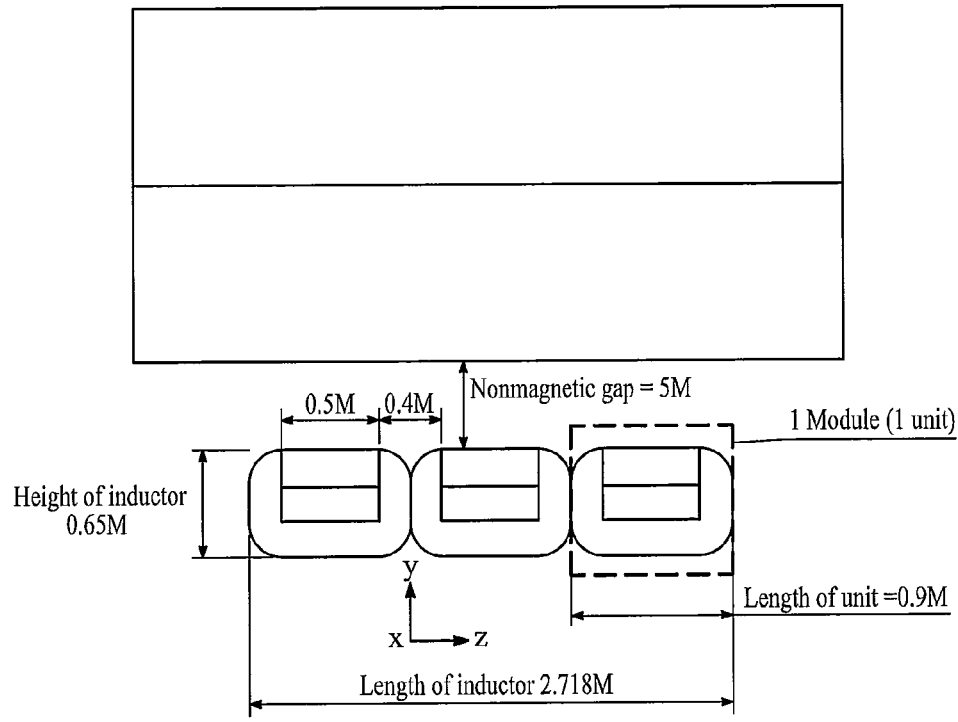
Figure 10:
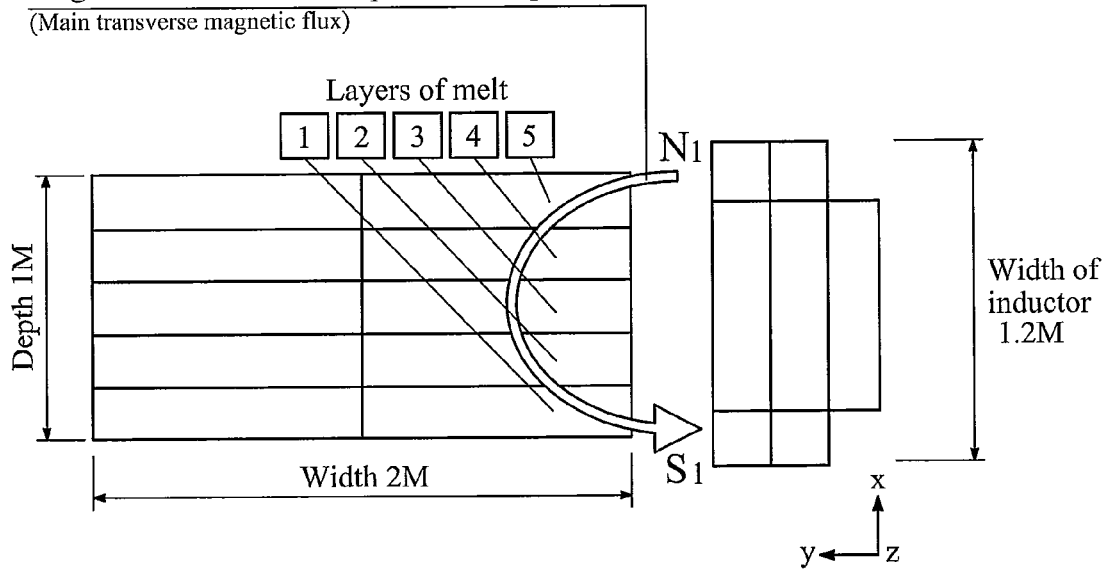
Figure 11A:
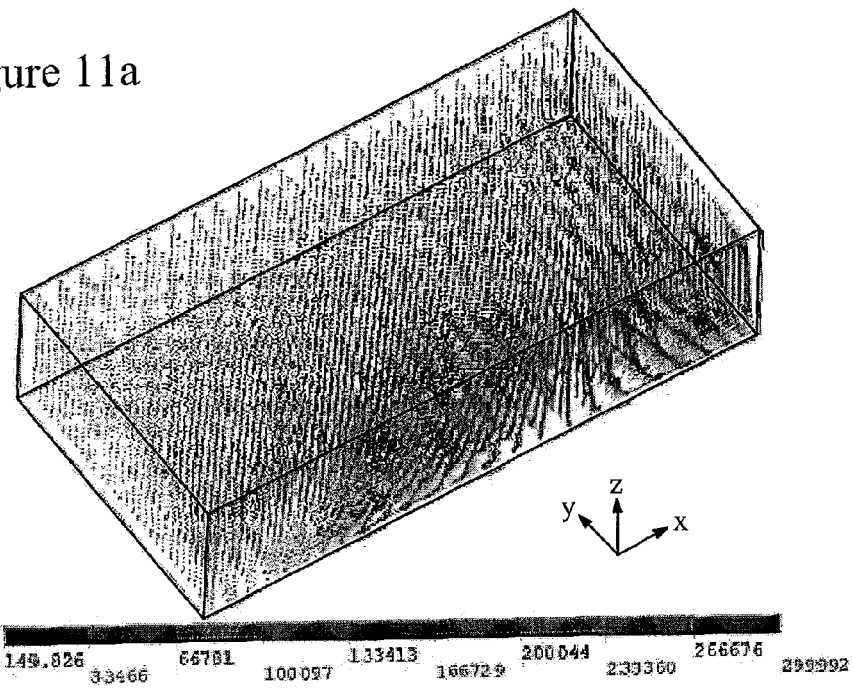
Figure 11B:
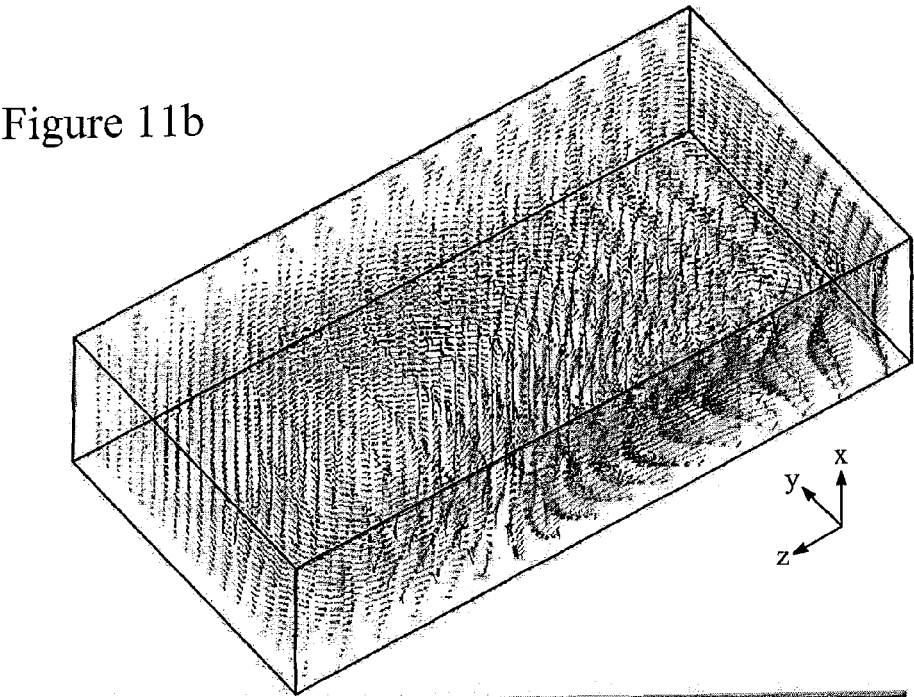
Figure 12A:
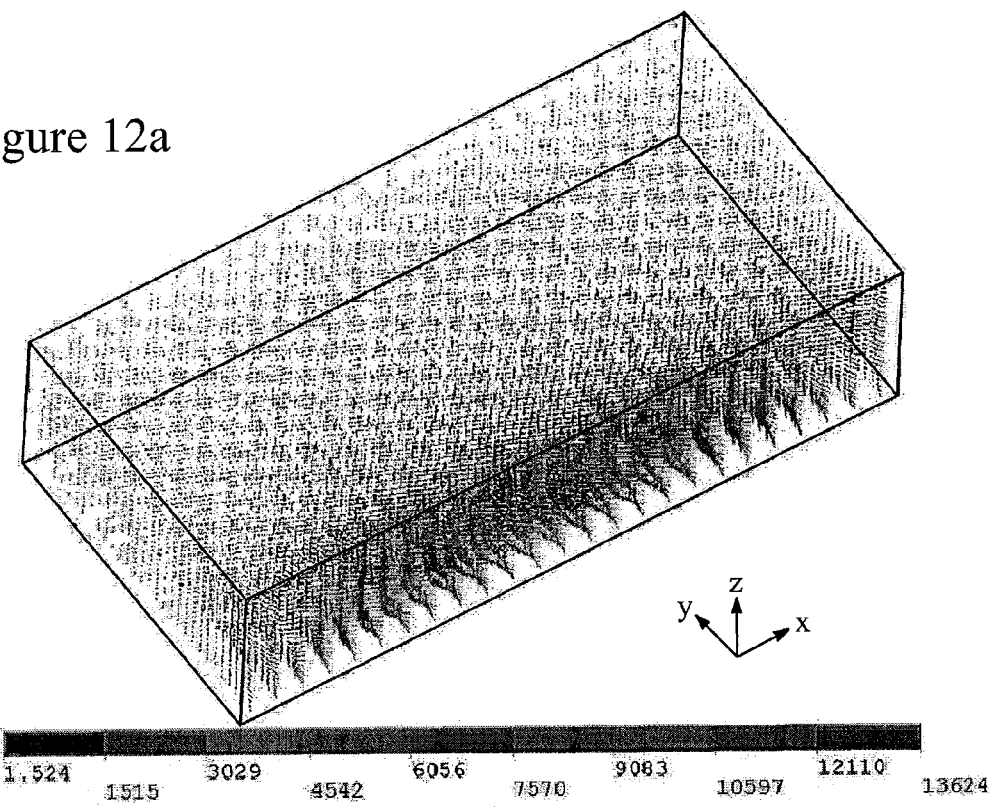
Figure 12B:
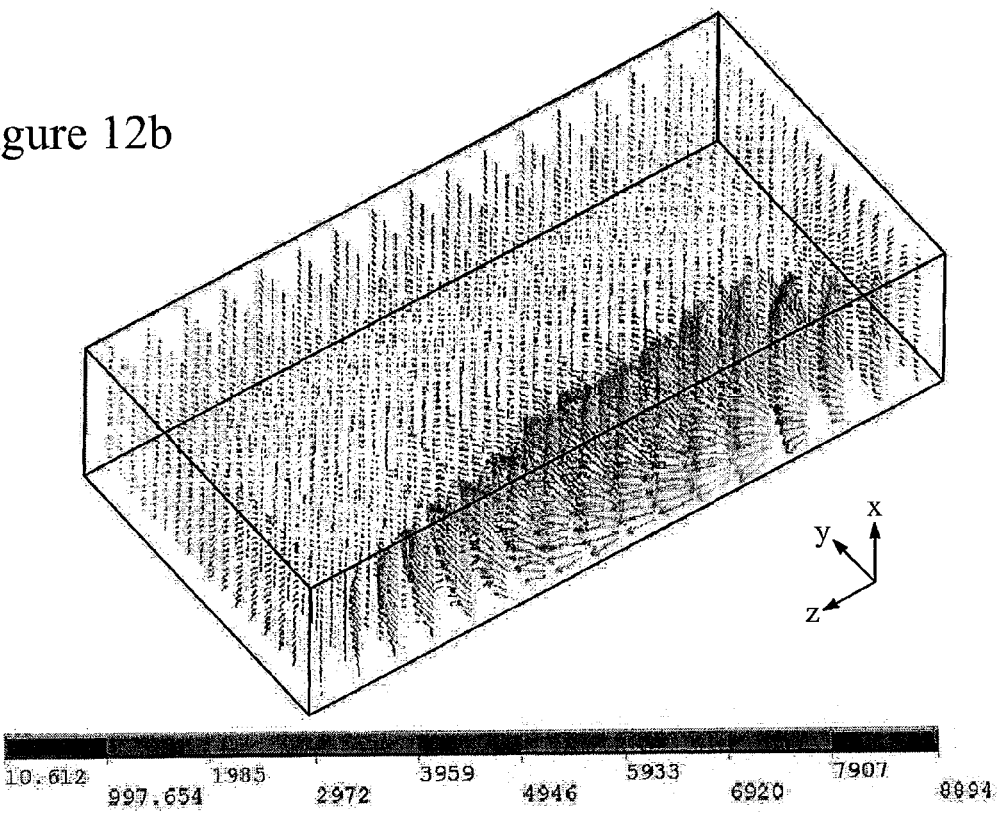
Figure 13A:
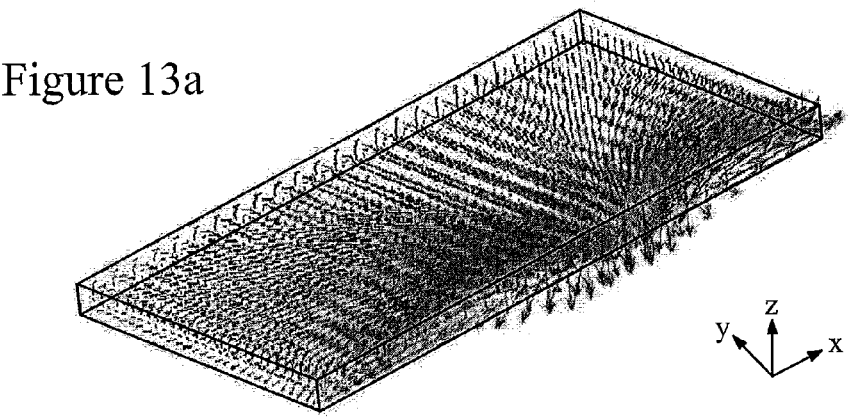
Figure 13B:
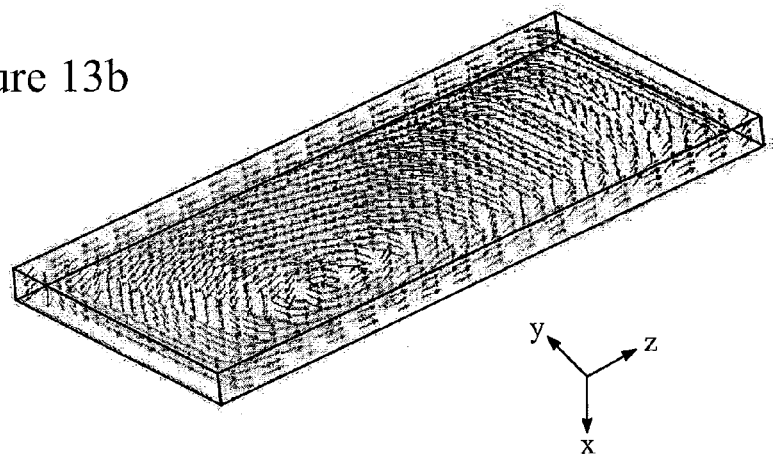
Figure 14A:
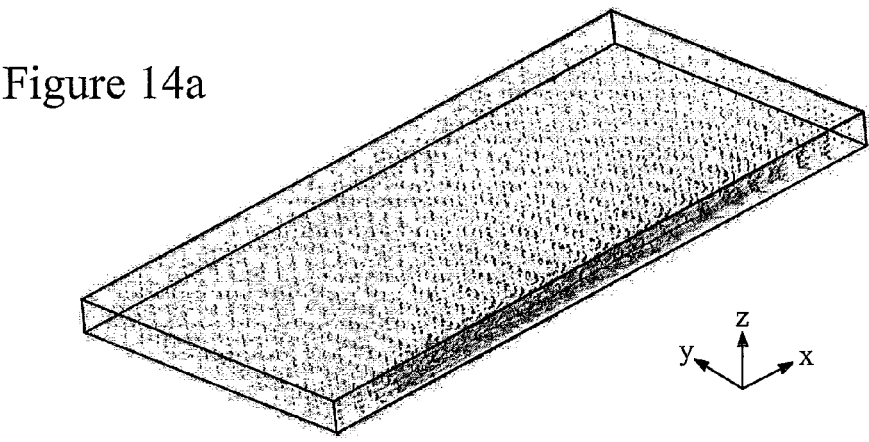
Figure 14B:
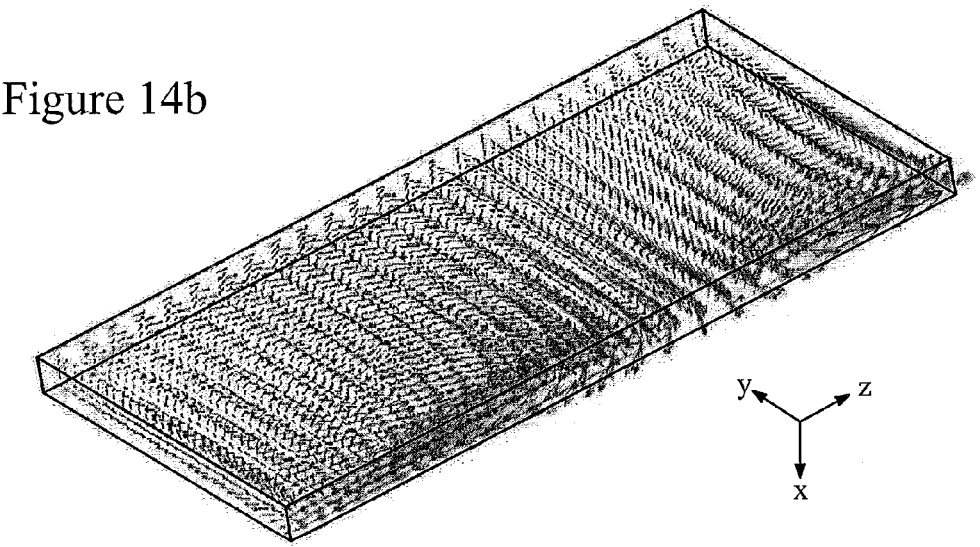
Figure 15A:
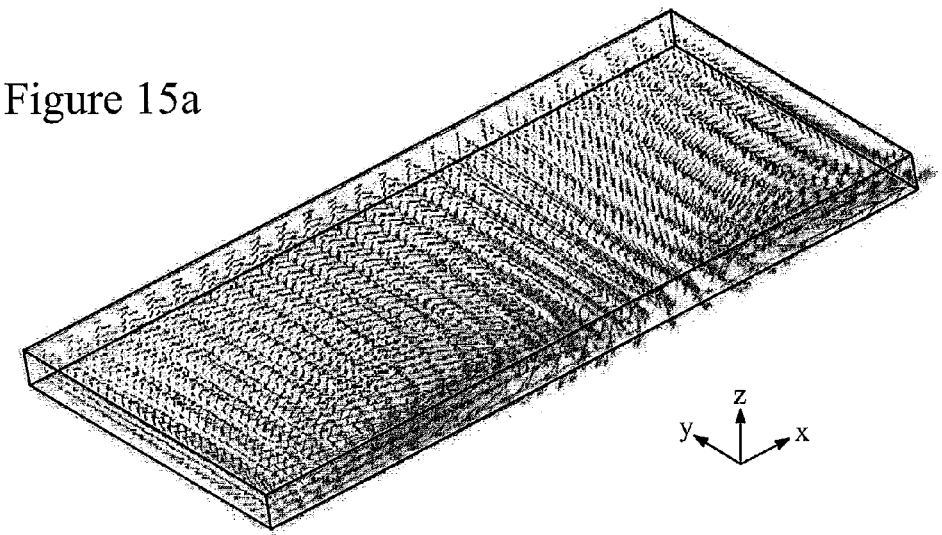
Figure 15B:
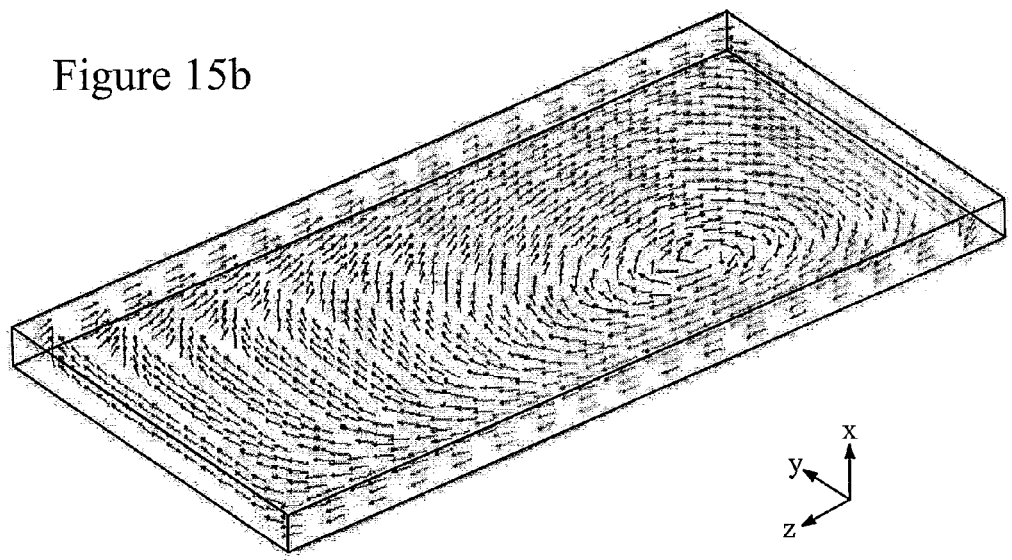
Figure 16A:
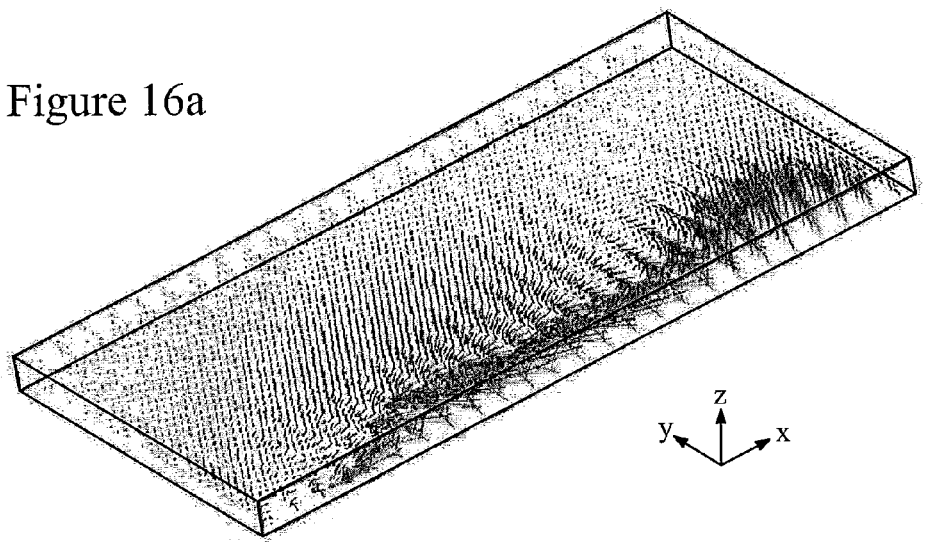
Figure 16B:
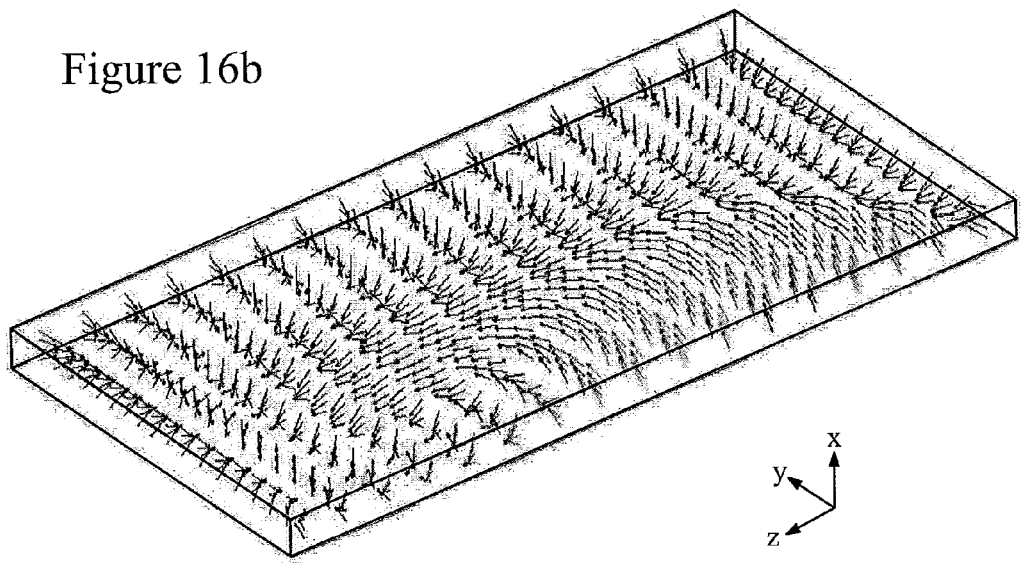
Figure 17:
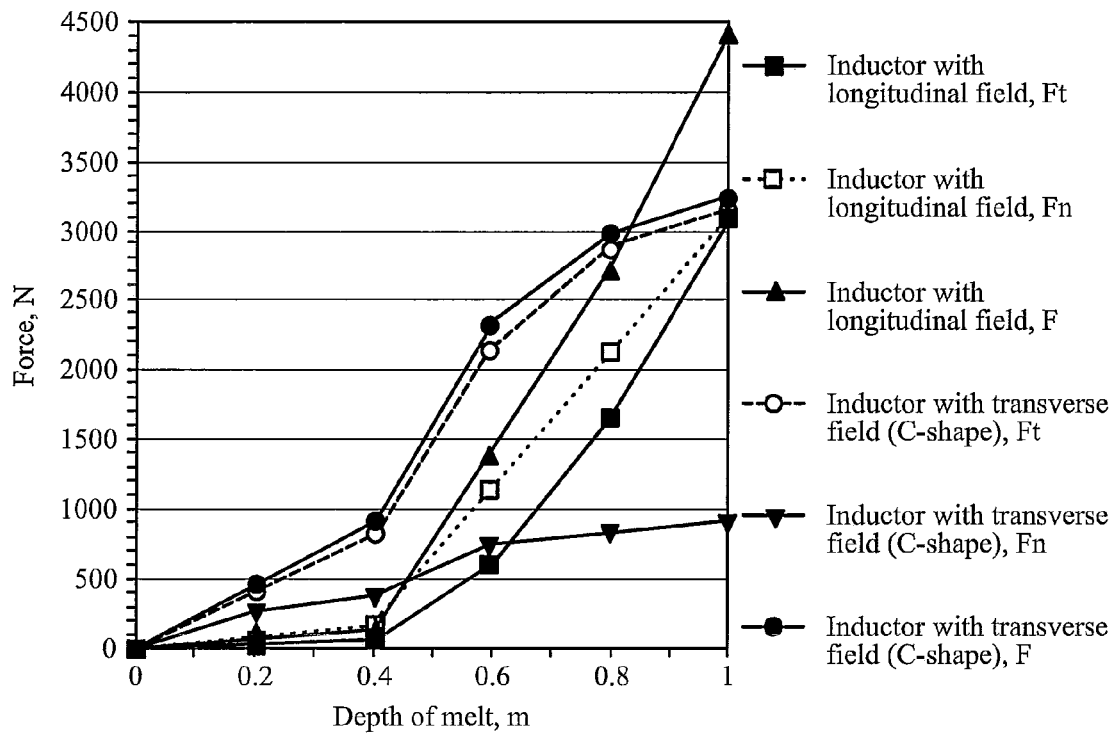
Figure 18:
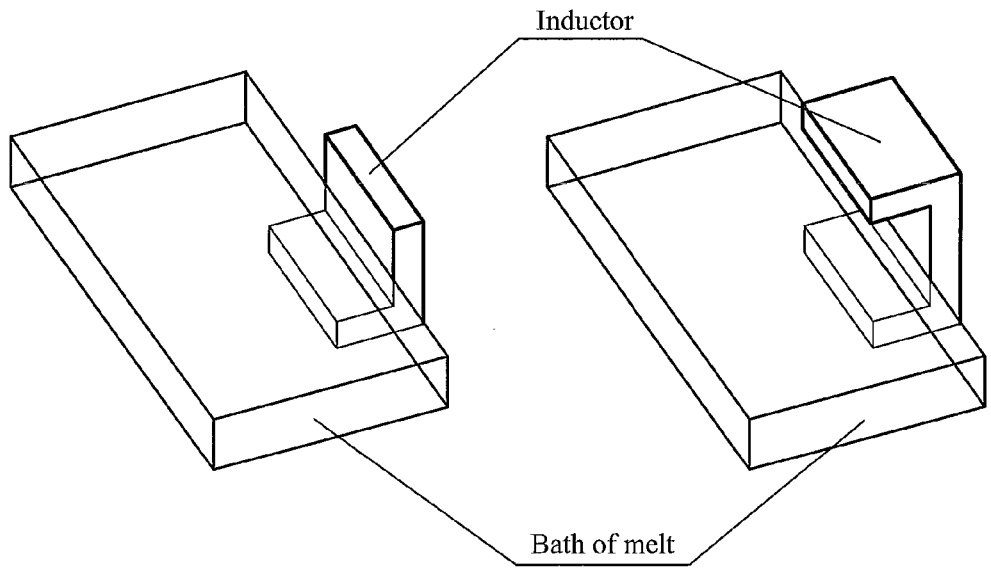
Figure 19:
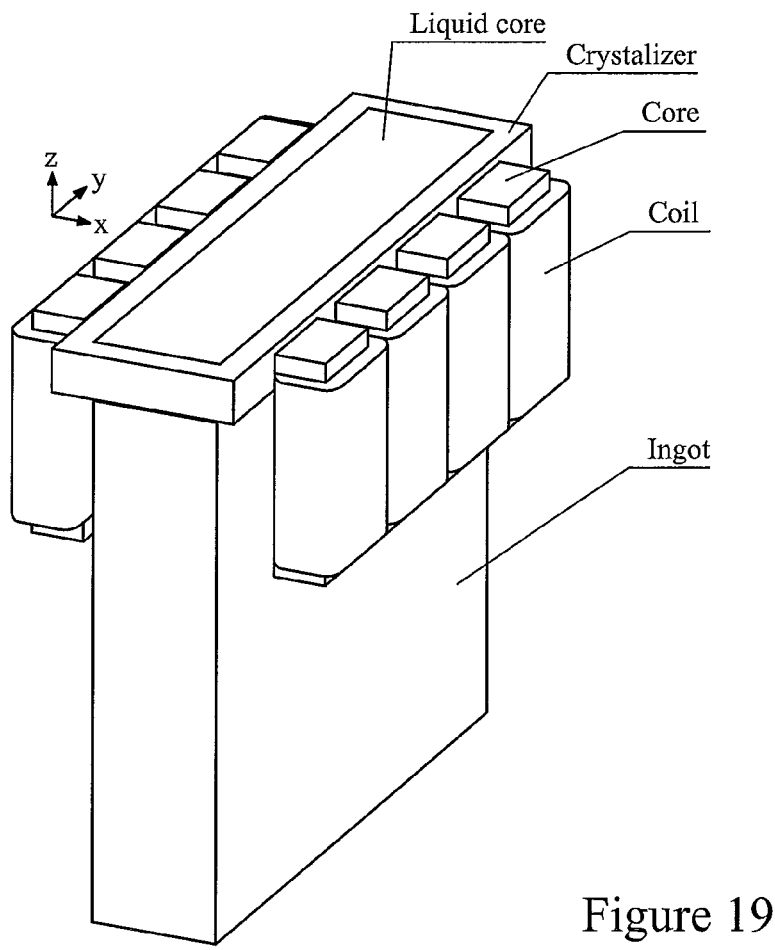

FIG. 4 provides an illustration of two C-shaped inductors with C-shaped cores;

FIG. 5 is a modeled inductor with the longitudinal/transverse running magnetic field installed at the side of the furnace, in isometric view;

FIG. 6 is a modeled inductor with the perpendicular running magnetic field (C-shape core) installed at the side of the furnace, in isometric view;

FIG. 7 is the inductor of FIG. 5 in top view;
FIG. 8 is the inductor of FIGS. 5 and 7 in side view;
FIG. 9 is the inductor of FIG. 6, in top view;
FIG. 10 is the inductor of FIGS. 6 and 9 in side view;

FIG. 11a shows the eddy currents in the bath at the melt depth 1 m (all five layers) with the inductor with longitudinal running magnetic field;

FIG. 11b shows the eddy currents in the bath at the melt depth 1 m (all five layers) with the inductor with transverse running magnetic field;

FIG. 12a shows the density of Lorenz forces in the bath at the melt depth 1 m (all five layers) with the inductor with longitudinal running magnetic field;

FIG. 12b shows the density of Lorenz forces in the bath at the melt depth 1 m (all five layers) with the inductor with transverse running magnetic field;

FIG. 13a shows the eddy currents in the central layer of the melt (third layer, 0.2 m thickness) with the inductor with longitudinal running magnetic field;

FIG. 13b shows the eddy currents in the central layer of the melt (third layer, 0.2 m thickness) with the inductor with transverse running magnetic field (C-shape core);

FIG. 14a shows the density of Lorenz forces in the central layer of the melt (third layer, 0.2 m thickness) with the inductor with longitudinal running magnetic field;

FIG. 14b shows the density of Lorenz forces in the central layer of the melt (third layer, 0.2 m thickness) with the inductor with transverse running magnetic field;

FIG. 15a shows the eddy currents in the lower layer of the melt (first layer, 0.2 m thickness) with the inductor with longitudinal running magnetic field;

FIG. 15b shows the eddy currents in the lower layer of the melt (first layer, 0.2 m thickness) with the inductor with transverse running magnetic field;

FIG. 16a shows the density of Lorenz forces in the lower layer of the melt (first layer, 0.2 m thickness) with the inductor with longitudinal running magnetic field;

FIG. 16b shows the density of Lorenz forces in the lower layer of the melt (first layer, 0.2 m thickness) with the inductor with transverse running magnetic field;

FIG. 17 shows the dependence of integral forces created by inductors in the melt on the depth of melt in the bath;

FIG. 18 shows some inductor designs with partial covering of the bath;

FIG. 19 shows a pair of inductors installation with the transverse running magnetic field for ingot liquid core stirring during casting process; and FIGS. 20a to 20i show different combinations and orientations for inductors for use in ingot liquid core stirring during casting processes.

Figure 1A:
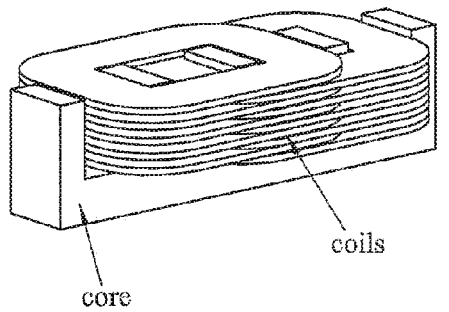
FIGS. 1a, 1b and 1c illustrate some typical MHD stirrer coil arrangements.
Figure 1B:
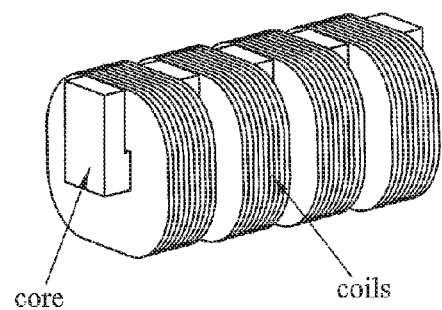
Figure 1C:
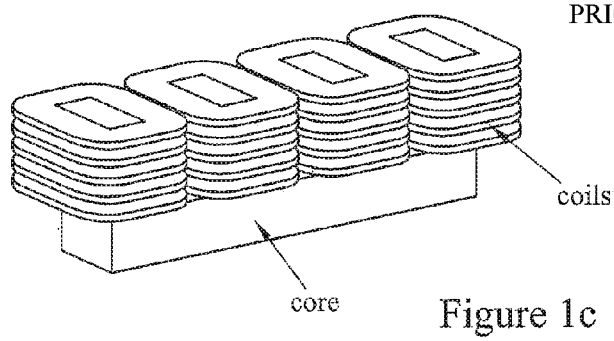

At present, different Magnetohydrodynamic, MHD, stirrers are widely used in the aluminium industry for alloys preparation, temperature homogenization and melting rate increase. Indeed MHD-stirrers have become a standard in effective casting facilities. Traditionally, an MHD-stirrer for metal in a furnaces is a linear induction motor that has two or three phase coils and could be manufactured in accordance to the different structural designs. Examples of typical coil constructions are shown in FIG. 1a to c. The FIG. 1a form has the interleaved type of coils; the FIG. 1b form has coils wrapped around the neck of the steel core; and the FIG. 1c form has the coils wrapped around the salient pole teeth.

With these types of coils, the inductors can have different number of phases and teeth depending on two, three or multi-pole designs. They can be salient or non-salient pole asynchronous motors. However, a consistent feature is that the arrangement for the magnetic poles and the control thereof, creates the running field along the inductor. Nevertheless in order to organize the effective stirring in the furnaces with side installation of inductor, such as is shown in FIG. 2, it is possible to use not only a longitudinal running field (towards the length and width of the melt bath), but also a perpendicular running field.

Figure 2:
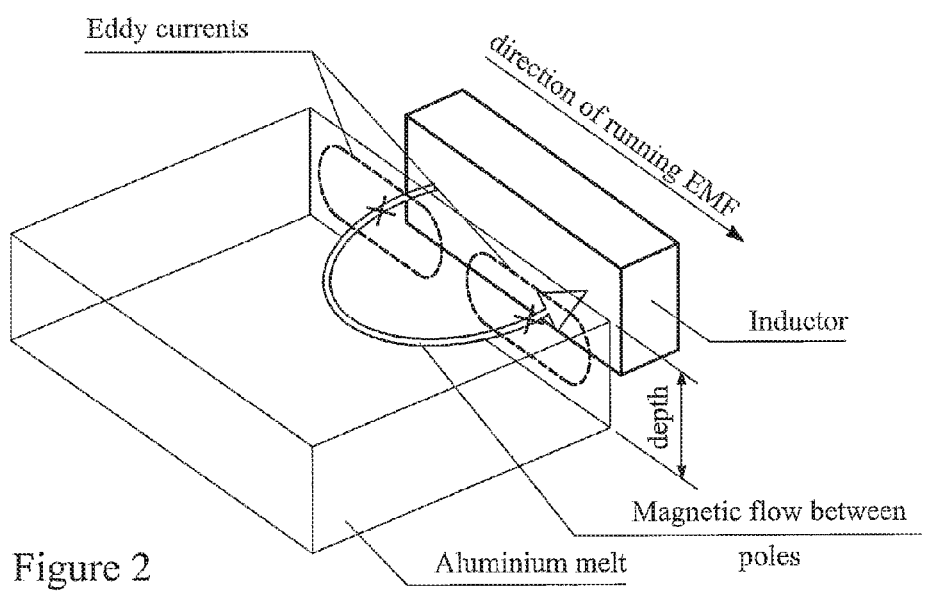
FIG. 2 illustrates the magnetic field between poles and eddy current arrangement according to a known MHD arrangement.

Referring to FIG. 2 in more detail, this shows an inductor installation at the side wall of the furnace, with the coils wound in the manner shown in one of FIGS. 1a, 1b or 1c. The inductor creates a running field by means of fluctuating magnetic field formation between magnetic poles located along the inductor. The magnetic flux is directed mainly along the inductor and partially penetrates the aluminium melt in the furnace.

As the installation provides a changing magnetic field (the running field) applied to a conductor (the molten aluminum), this creates eddy currents within the aluminum. These eddy currents form due to the electrons experiencing a Lorentz force perpendicular to their motion. These eddy currents are located mainly in the vertical plane and about the magnetic flux between the poles of the inductor. That is in a plane perpendicular to the melt surface. These eddy currents are shown by the dotted lines in FIG. 2.

These eddy currents induce magnetic flux of their own and so give additional beneficial stirring to the aluminum.

However, in such an arrangement there are occasions when the formation of the eddy currents is impaired. During melt level reduction, when molten metal leaves the furnace to go to the casting process, the depth of molten metal reduces and reduces within the furnace. In a similar manner, during start up of furnace, only a low level of melt is present at the beginning of scrap melting process. Both these situations mean that the molten metal depth present and hence the extent of the electrical conductor in the direction the eddy currents wish to form in is small. As a result, the eddy currents themselves in the melt are small.

Thus a reduction in the metal depth means that there is a reduction in the effectiveness of the stirring process. The Ampere force created in the melt by means of eddy currents and inductor electromagnetic field interaction will be low.

The present invention seeks to address this problem and provide more effective stirring even when a reduced depth of molten metal is present.

Figure 3:
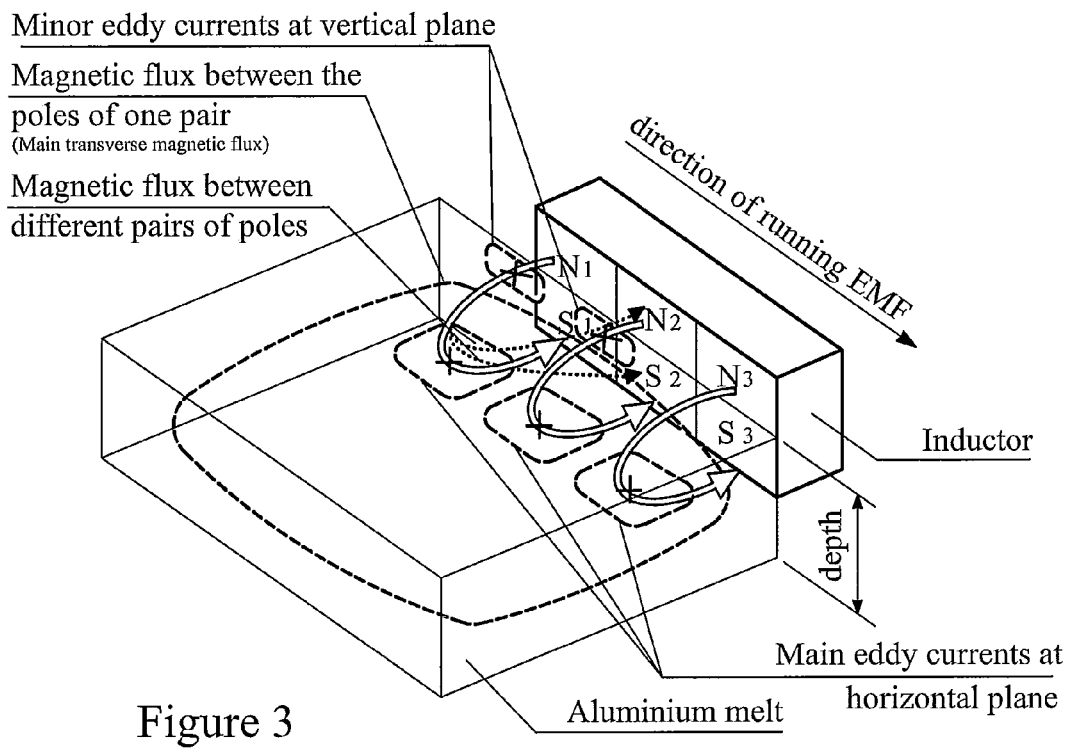
FIG. 3 illustrates the magnetic field between poles and eddy current arrangement according to the invention.

The invention, as illustrated in FIG. 3, alters the configuration of the electromagnetic field. In FIG. 3, the inductor is installed again on the side of the furnace containing the melt. However, the inductor consists of at least two pole pairs, marked $S_1N_1$, $S_2N_2$, $S_3N_3$, etc, which create the running electromagnetic field; shown by the bold arrow.

In order to create a running magnetic field, it is necessary to use at least a pair of magnetic poles $S_1N_1$ and $S_2N_2$ located together and having time-phase shift between them to cause the magnetic fluxes. For example the angle could be as much as 90 electrical degrees. This provides the following phase angles for the magnetic fluxes for the poles: $\phi S_1=0°$; $\phi N_1=180°$; $\phi S_2=90°$; $\phi N_2=270°$. These coils could be provided by using two C-shape inductors located close to one another and with a coil would around the top and bottom section of each of the C shapes. If the coils are fed by AC power supply with modulated frequency and phase shift by 90° towards each other then the running magnetic field is provided. The running magnetic field formation is provided by means of space and time shift between the magnetic fluxes which can produce two, three and multi-phase systems used as inductors for melt stirring.

As before, in FIG. 3, the running magnetic field provides a changing magnetic field applied to a conductor (the molten aluminum) and thus creates eddy currents within the aluminum, with these eddy currents predominantly being in the vertical plane and being small because of the small depth of molten metal. The penetration of the running magnetic field into the melt and the eddy currents it creates are not shown in FIG. 3. This can be considered as a first magnetic field component.

The arrangement of magnetic poles is determined by the design of the inductor and could be manufactured with a variety of forms of inductor and coil. In the described example, with C-shape cores, one pair of poles is formed by the C-shape core and with the coils wound around it. Each C-shape inductor ideally has at least one-phase winding (at least one phase). The use of C-shaped cores means that the magnetic field generated can be concentrated at one side of the structure.

The use of I-shaped cores means that the magnetic field generated can be symmetrical on both sides. Such an arrangement with a symmetrical field on either side, or other arrangements could for instance be used to simultaneously stir two or more different volumes of molten metal. As an example, the inductor could be placed between two different ingot casting machines and so stir both the ingots being cast.

Additional concentrators for the magnetic flux can be provided as needed to form the magnetic field in the shape needed.

The range of uses for such devices is very wide. They can be used for stirring in furnaces of many different shapes and depths, for stirring in many other vessel designs, shapes and depths (such as ladles) and for stirring in other situations where molten metal is present, for instance in ingot casting as the volume of the liquid core reduces.

Because of the nature of the inductors used and the magnetic field shape/planes and eddy current planes employed in the invention, it is possible for the height of the inductor core to be less than the melt depth, a match for the melt depth or greater than the melt depth and yet still function effectively.

In addition to the running magnetic field, in FIG. 3, the pole pairs such as $S_1N_1$, create a further magnetic field that penetrates into the melt in a vertical plane, i.e. mainly perpendicular to the running electromagnetic field direction; this further magnetic field is shown by the bold arrows in FIG. 3. This can be considered as a second magnetic field component. This new further magnetic field causes the formation of new eddy current contours within the melt. However, when compared with the known installation of FIG. 2, these new eddy currents are located in a different plane because the magnetic field generating them is in a different plane. These eddy currents are perpendicular to the further magnetic field generating them and hence are more powerful in the horizontal plane of the melt surface; dotted lines in FIG. 3. As these primary eddy currents form in the horizontal plane, they provide the maximum effect to the Lorentz forces formation in the melt and hence increased stirring.

Thus there are different magnetic pole pairs along the length of the side of the furnace to provide the running magnetic field and different magnetic pole pairs extended up the height of the furnace to provide the further magnetic field and hence the horizontal plane eddy currents.

Besides eddy currents in the horizontal plane of the melt surface, the magnetic flux between poles $S_1N_1$ creates contours with eddy current in vertical plane as well; secondary eddy currents. These will be much less powerful compared to the primary ones in the horizontal plane. This is because the reduced electrical conductance and the conditions for eddy currents formation in the horizontal plane are much better than in the vertical, as the extent of the melt is less in the vertical plane due to the low melt depth, which is significantly less than the width or length of the melt surface.

The demagnetizing effect of the magnetic flux is also very strong while flowing from the pole $S_1$ coming to $N_1$ penetrating through the vertical contour of the melt.

In the horizontal plane of the melt surface, the conditions for eddy current are much better due to a large horizontal extent for the melt. Besides there is no self-demagnetizing effect of the magnetic flux in this plane as it flows in one direction only. Of course besides strictly vertical and horizontal planes there are other intermediate planes with their own conditions for eddy current formation. But is it clear that the conditions improve while moving from vertical plane to horizontal.

It is also clear that for the creation of maximum magnetic flux between $S_1N_1$, the phase angle between the magnetic fluxes must be 180°, for instance, a C-shaped core with coils connected to the AC power supply with modulated frequency; such cores are illustrated in FIG. 4.

The other pole pairs $S_2N_2$ and $S_3N_3$ at their phase angle play a similar role in eddy currents and Ampere force formation.

Of course if the magnetic poles are located not only along the width but also along the height of inductor the magnetic fluxes will appear between all the poles having phase shift towards each other. For example magnetic fields will appear between the poles of different pairs—between S1 and S2, between S1 and N2, between S1 and S3 and so on. These secondary magnetic fluxes shall create eddy currents as well as Lorentz forces in the melt. Longitudinal running magnetic field appears between the poles along the inductor in such case. But the less metal depth, the less fluxes affecting Lorentz forces formation will be observed. At low melt level main affect shall be carried out by the perpendicular magnetic flux between the poles of one pair due to it flows within a plane perpendicular to the horizontal cross section of the bath (metal surface).

With the stirring using running electromagnetic field perpendicular to the melt surface it is possible to organize the effective stirring with side installation of the inductor even for low melt depth 5-10 cm.

The next section considers a mathematical model of a furnace being stirred with different inductors and layers so as to allow a comparative evaluation.

Let us take a look at two cases of inductors installation from the side of the furnace. Each inductor generates running field of different type. In the first case as shown on the FIGS. 5, 7 and 8, the inductor generates longitudinal magnetic running field (as per FIG. 2). In the second case as shown in FIGS. 6, 9 and 10, the inductor generates a transverse running magnetic field (as per FIG. 3 and the invention).

Both cases are equivalent in the following parameters—size of inductors, positioning towards the aluminum melt bath, equal active power in the coils (with the equal volume of the coils) which is 50 kWt per each inductor, with that the current density in the cross section of coils in both inductors was the same ($2 \cdot 10^6$ A/m$^2$).

The non-magnetic gap between the inductor and the melt of aluminum is 0.5 m. The size of the melt bath is Length×Width×Depth=4 m×2 m×1 m, that corresponds to the volume of the bath V=8 m$^3$ and a mass M at the bath density $\rho$=2.3 ton/m$^3$, M=8×2.3=18.4 tons.

In order to investigate how the effectiveness of the inductors is affected by the melt at different depths along the melt bath, the bath was divided into five layers in horizontal plane. The thickness of each layer is t=0.2 m. So, by means of combinations of the layers in the mathematical model, the effectiveness of the inductors influence was investigated at different depth of the melt with a step t=0.2 m.

To hold the electromagnetic calculation, the equivalent conditions of running magnetic field created by coils were used. i.e. current phases in the coils were the following Phase A=0°, Phase B=60°, Phase C=120°, which is generally corresponds to the AYC scheme of connection. The AC frequency was set at f=0.5 Hz.

Other views, in other planes, of the inductors and the bath are shown on FIGS. 7 to 10. In FIGS. 7 and 9, the dotted line shows the full module of the inductor. Structurally it includes one phase of inductor and can easily provide the assembly of the inductor with the demanded number of modules.

The results of the modeling using the comparative evaluations described above is now provided.

In consequence of the mathematical modeling, the integral and differential characteristics describing the effectiveness of inductors influence to the melt were obtained. The most important are the integral tangential force, Ft (the amount of forces that influence the melt along the bath length, i.e. along the inductor running field direction), the integral normal force, Fn (the amount of forces that influence the melt along the width of the bath, i.e. perpendicular to the inductor running field direction), the total amount of forces, $F=\sqrt{Fn^2+Ft^2}$, as well as the active power generated in the melt, Pm. Besides the above mentioned very important differential characteristic, are the eddy currents and the Lorentz forces distribution in the melt. These characteristics can evaluate the effectiveness of electromagnetic field developed by the inductor.

Below there are set out the results of the calculation of the form of eddy currents and Lorentz forces distribution in the bath for the following cases:
1. A full bath with a depth of 1 m. The results are shown on FIGS. 11a, 11b, 12a and 12b.
2. The central part of the bath only—the central part of the melt only (third layer 0.2 m thick). The results are shown in FIGS. 13a, 13b, 14a and 14b. This calculation is necessary for analysis of the inductor positioning in such a way that the effectiveness of the inductor electromagnetic field to the thin layer of the melt will be maximal for both types of inductors. This is achieved by the location of the melt thin layer in the middle part of inductor width, i.e. in the area of maximal magnetic field.
3. The bath is filled with the melt depth at 0.2 m from the bottom—first layer only. Such melt depth is typical for the start of scrap melting cycle. The results are shown in FIGS. 15a, 15b, 16a and 16b.

Based on the distribution of the eddy currents and Lorentz forces at different layers we can make the following conclusion:

The conditions for eddy currents creation with the bath depth reducing, in the case of the inductor with the transverse running field (C-shape) do not worsen so fast as in the case of the inductor with longitudinal magnetic field;

The Lorentz forces distribution at low melt depth, FIGS. 16a and 16b, shows that the inductor with longitudinal magnetic field creates Lorentz forces field in the melt with a low density located close to the bath wall. In contrast to this, the transverse running magnetic field usage allows Lorentz forces field to cover the whole bath volume rather far from the bath wall but the force density has larger values and they are distributed more uniform at the bath wall in the place of inductor installation.

If we analyze the integral characteristics obtained for all calculated cases at different depth of the melt from Depth=0 up to 1 m with a step 0.2 m, and a case with the central (third) layer only, we can achieve the results depicted in the tables 1 and 2 below.

TABLE 1

Integral forces at different depth

| Depth of melt, m | Inductor with transverse field (C-shape core) | | | Inductor with longitudinal field | | |
|---|---|---|---|---|---|---|
| | Fn, N | Ft, N | F, N | Fn, N | Ft, N | F, N |
| 0.2 | 258 | 369 | 450 | 90 | 31 | 95 |
| 0.4 | 390 | 840 | 926 | 142 | 41 | 148 |
| 0.6 | 750 | 2213 | 2337 | 1159 | 608 | 1309 |
| 0.8 | 843 | 2883 | 3004 | 2142 | 1654 | 2706 |
| 1 | 918 | 3170 | 3300 | 3103 | 3121 | 4401 |
| Central layer case (when the melt is in the third layer only) | | | | | | |
| 0.2 | 626 | 375 | 730 | 62 | 4 | 62 |

To analyze the effectiveness of inductor operation, it is convenient to use the relation between integral volume of forces to electrical power created in the melt $k_{ef}^1$=F/Pm (see Table 2).

Of course $k_{ef}$ can be calculated as F/P or F/S, where P (active power created in the system and consumed from the power system by the power supply unit) and S (total power), but in case of current comparison analysis $k_{ef}$=F/Pm is more conclusive due to active power dissipated in the coils of both inductors is equal.

This relation visually shows the effectiveness of the electromagnetic field created by the inductor in the melt towards the Lorentz forces it creates and $k_{ef}$ could be treated as MHD-stirrer efficiency factor. In such a way $k_{ef}$ characterize the inductor and its work relatively metal mixing influence creation. It is obvious that the more value of $k_{ef}$ the more effective the field created by inductor in the melt and more force F is created per 1 kWt of power created in the melt.

TABLE 2

Power created in the melt and inductor efficiency factor at different bath depth

| Depth of melt, m | Inductor with transverse field (C-shape core) | | Inductor with longitudinal field | |
|---|---|---|---|---|
| | Pm, kWt | $k_{ef}$ = F/Pm, N/kWt | Pm, kWt | $k_{ef}$ = F/Pm, N/kWt |
| 0.2 | 2.218 | 203.00 | 313 | 0.30 |
| 0.4 | 3.126 | 298.75 | 1.49 | 99.19 |
| 0.6 | 5.325 | 438.80 | 4.024 | 325.25 |
| 0.8 | 5.967 | 503.39 | 7.319 | 369.76 |
| 1 | 6.335 | 520.95 | 10.499 | 419.19 |
| Central layer case (when the melt is in the third layer only) | | | | |
| 0.2 | 3.547 | 205.73 | 217 | 0.29 |

Using the tables above we can build visual dependence of forces from the melt depth for both types of inductors, FIG. 17

From the dependence shown in FIG. 17, it is seen that the inductor with the transverse running magnetic field (C-shape core) creates essentially higher integral Lorentz force in the melt than the inductor with longitudinal magnetic field down to the melt level, Depth ~0.8 m. At that depth, with the low melt levels=0÷0.4 m inductor with the transverse running field is much better than the inductor with longitudinal magnetic field, if we compare the created force in the melt. Besides, as per Table 2, the inductor with the transverse running magnetic field is much more effective based on $k_{ef}$ parameter, than any other type of inductors.

Of course the designs of inductors considered in the model does not cover all types of inductors and coils connection schemes but the results depicted in the model clearly show that the usage of inductors with transverse magnetic field (C-shape core) is much more efficient than inductors with the longitudinal magnetic field in cases when melt depth in the bath is equal to the width of inductor or much lower. Considering that point further, the use of inductors with the transverse running magnetic field is more preferable in the following cases:

For furnace side wall installation with a low melt depth to be stirred. This is typically required at the beginning of the scrap melting cycle in the furnace when the aluminum melt level is low. Besides inductor installation from the side of the furnace it is possible to design it in such a way that it partially covers the melt from the top, from the top and the bottom or just from the bottom as shown on the FIG. 18. In this case the conditions for transverse running flux between the poles are improved due to reduction of magnetic resistance and the distance between the poles.

For intermediate volumes installations with a low melt depth. This is typically required for transport ladles/crucibles or intermediate volumes for alloy preparation.

For furnace bottom installation, if the furnace bottom width at the place of inductor installation is comparatively equal to the width of inductor. It is typically required for narrow furnaces or melting furnaces with the cross section in the shape of trapezium where the narrow basement is faced towards inductor.

For stirring of the large rectangular shape aluminum ingot liquid core during the process of vertical semi-continuous casting.

In the case of aluminum ingot casting, the inductor is installed along the wide side of the ingot and provides stirring effect of the liquid core mainly in horizontal plane. This is essential as the depth of the liquid core in the aluminum ingot is ~1 m (for large ingots size ~2500×600 mm). FIG. 19 shows the installation of a couple of inductors along both sides of the ingot for stirring of the liquid core. Each inductor consists of four modules with C-shape cores (two phase system) though it may contain any even or uneven number of modules thus two or more phases. As a result, there is the running magnetic field parallel to the plane of the surface and along the wide side of the ingot, the further magnetic field perpendicular to that and extending downward in the ingot and the eddy currents in the horizontal plane within the ingot. The design can be configured such that the inductor itself and/or the magnetic field it generates matches or exceeds the maximum width and/or depth and/or length of molten metal in the liquid core of the ingot.

The descriptions of inductors with transverse running field listed herein do not cover all the cases possible. The general concept described in the invention can be used to create MHD-stirring in a wide variety of similar applications, with relatively low melt depth, and in a wide variety of different uses. Of course, different designs of inductors can be used to create the transverse running field and these may be different from the C-shape core inductor design discussed above. As examples of such further arrangements, reference is made to the case of ingot stirring and the arrangements illustrated in FIGS. 20a to 20i. For ease of illustration, only the inductors on one side of the ingot are shown. In practice, inductors may be present on both sides of the ingot. The number, orientation, inclination and other variables for the inductors may differ from one side to the other; the inductors are not necessarily mirror images of one another. The FIG. 20a example features three C-shaped cores, vertically mounted along one side of the casting apparatus for the ingot. Magnetic field directions/planes and eddy current planes of the type described in relation to FIG. 19 are achieved.

FIG. 20b again uses three C-shaped cores, but they are offset relative to the vertical by around 30° so as to vary the stirring achieved. In this case the magnetic field is relatively complex due to the different orientations used and the variation as the magnetic field changes with time. In general terms, however, the running field mainly moves along the wide side of the ingot and is still generally parallel to the surface of the metal. The magnetic field loops from pole to pole within each C-shaped core and so has a substantial vertical element but is offset from the vertical by the same offset as the cores themselves. The eddy currents formed by the magnetic field has a substantial horizontal element, but also is offset as it remains perpendicular to the magnetic field which forms the eddy currents.

Figure 20A:
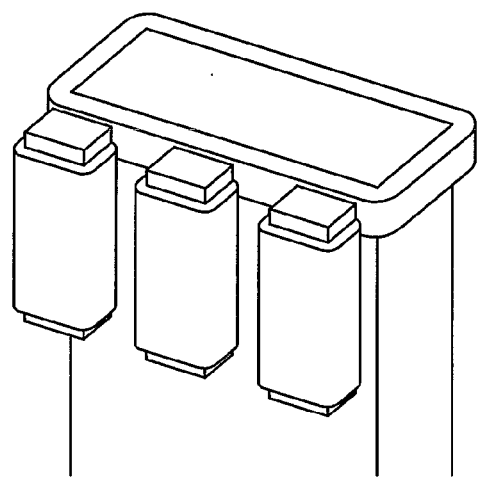
Figure 20B:
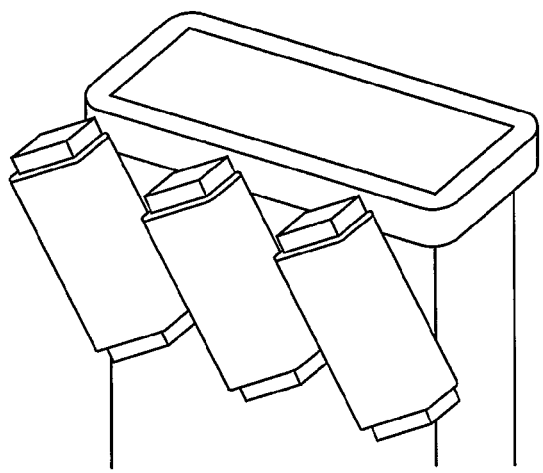
Figure 20C:
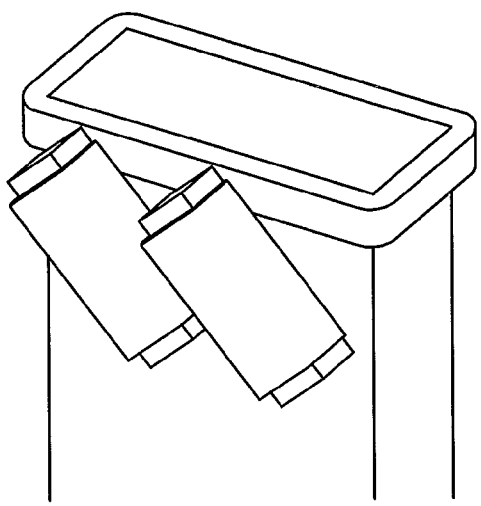

FIG. 20c shows a similar arrangement and similar resulting magnetic field directions/planes and eddy current planes, but through the use of only two C-shaped cores.

Figure 20D:
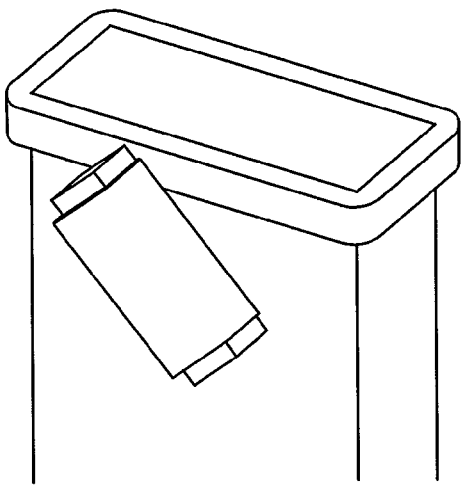

FIG. 20d shows a single C-shaped core with a similar inclination from the vertical to the FIGS. 20b and 20c forms. In this case the field created by a pair of poles at one C-shape core. The magnetic field still forms with a substantial vertical element and the offset from the vertical, with the eddy currents having a substantial horizontal element, but also an offset.

Figure 20E:
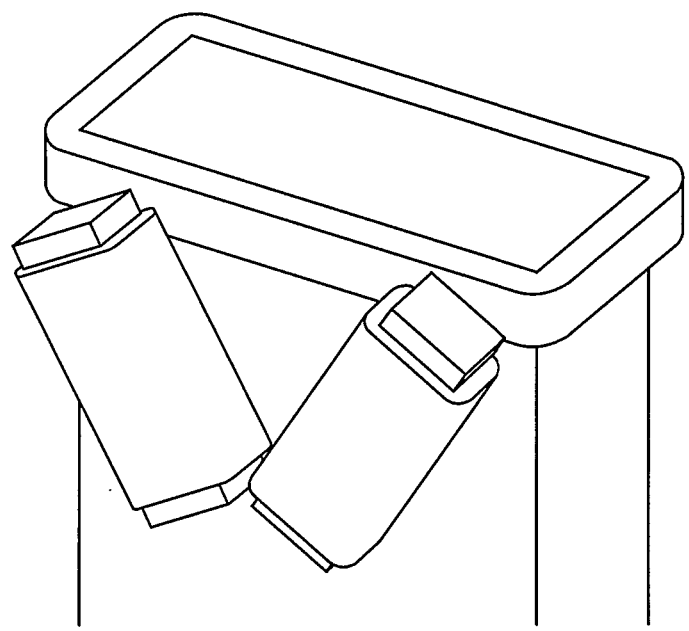

FIG. 20e shows a two C-shaped core design where the two cores are both offset by the same amount from the vertical, again around 30°, but with the offsets being in different directions from the vertical. Again the running field moves along the wide side of the ingot and is still general parallel to the surface of the metal. The magnetic field loops from pole to pole within each C-shaped core and so has a substantial vertical element but is offset from the vertical by the same offset as the cores themselves. However, the offsets are in different directions and can generate different overall field shapes than in the FIG. 20c design. The magnetic fields and the resulting eddy currents may be more concentrated in the lower part of the core as the inductors are angled in towards each other in this design. Different stirring effects are this achieved.

Figure 20F:
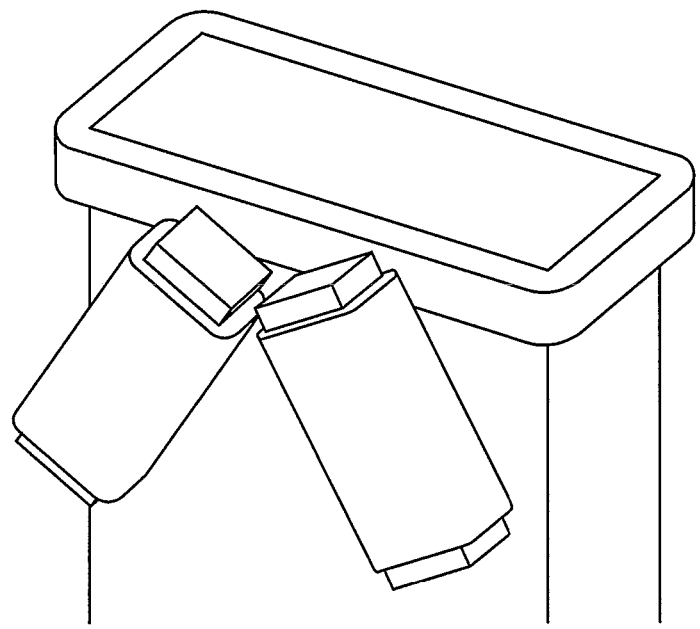

FIG. 20f shows a similar design to FIG. 20e, but with the inductors closer together at the top. Again different magnetic field shapes, interactions and eddy current configurations are provided as a result.

Figure 20G:
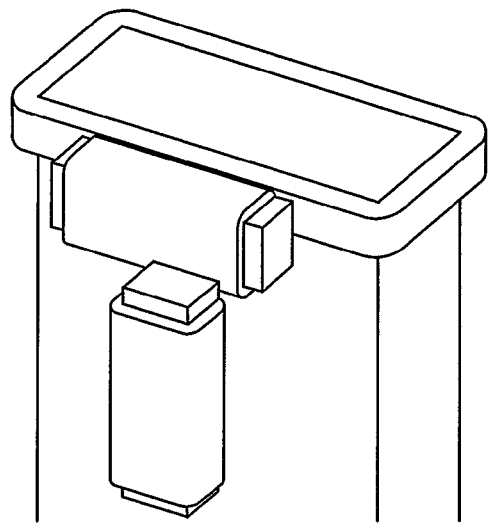

FIG. 20g shows a still further design. In this case, the design includes two C-shaped cores, with one vertically mounted and one horizontally mounted above the vertically mounted core. The overall magnetic field configuration and its variation with time is complex in such a design, but the same general principles apply in terms of the running field being generated, the first magnetic field component, the perpendicular second magnetic field component and the eddy currents generated as a result.

Figure 20H:
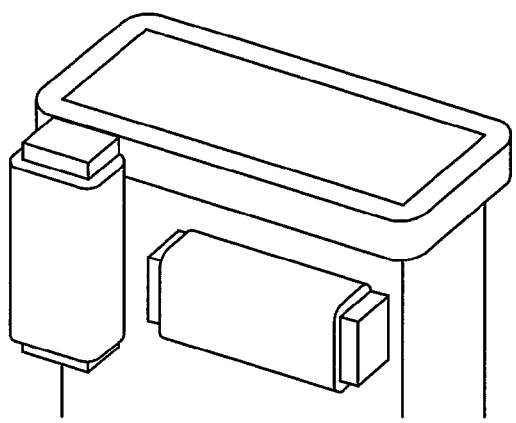

FIG. 20h shows a similar design to FIG. 20g, but with the vertically mounted core uppermost and the horizontally mounted core below it.

Figure 20I:
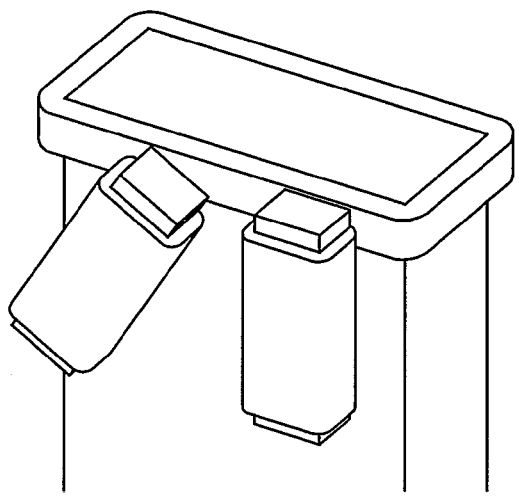

FIG. 20i shows a design with one vertically mounted C-shaped core and a further C-shaped core which is inclined to the vertical. The overall magnetic field configuration and its variation with time is complex in such a design, but the same general principles apply in terms of the running field being generated, the first magnetic field component, the perpendicular second magnetic field component and the eddy currents generated as a result.

Of course, the designs shown in FIGS. 20a to 20i are just a very small number of the design combinations possible using one or more inductors according to the invention. Further designs are possible using different combinations of the number of inductors, the shapes of their cores, the number of windings, the phase they are provided in and so on. Each module in a design could be single phase or multi-phase. The flux generation frequency can be varied with time for a module and/or provided at different values for different modules. The design can be optimized to the stirring situation it is intended to handle, taking into account the shape of the liquid to be stirred, its properties and the depth of metal present. As an example, the inductor design can be provided so as to promote flow of the molten metal towards the centre of a vessel and then downward into the mass of molten metal, potentially so as to give good mixing of additives added to the molten metal and/or so as to bring non-melted metal (such as scrap) into close contact with the melt and promote melting of the metal.

The invention claimed is:

1. A method for moving a molten metal, the method including:
   a) providing the molten metal in a container, the molten metal having a surface which defines a first plane;
   b) providing an electromagnetic inductor, the electromagnetic inductor generating an electromagnetic field in use, a part of the electromagnetic field entering the molten metal, the electromagnetic inductor including at least two pairs of electromagnetic poles, each pole pair being formed around a core, at least one coil being wound around the core;
   the poles in an electromagnetic pole pair having a separation from one another in a first direction; and
   one electromagnetic pole pair having a separation from another electromagnetic pole pair in a second direction, the second direction being parallel to the first plane and being different to the first direction;
   c) providing a controller for the electromagnetic inductor, the controller controlling the current and/or voltage and/or phase applied to one or more of the coils, wherein:
   i) a first magnetic field component is generated between one pole in a first electromagnetic pole pair and a second pole in a different electromagnetic pole pair, the molten metal being moved by the first magnetic field component in one or more first directions;
   ii) a second magnetic field component is generated between the two poles in one or more electromagnetic pole pairs, the molten metal being moved in one or more second directions by Ampere forces initiated by eddy currents generated by the second magnetic field component.

2. The method according to claim 1, wherein the electromagnetic inductor has a depth, the depth extending perpendicular to the first plane and wherein the depth of molten metal in the container is equal to or less than the depth of the inductor.

3. The method according to claim 2, wherein the container is an ingot for a continuous casting system, wherein the molten metal is a liquid core, and wherein the depth of molten metal is the depth of the liquid core.

4. The method according to claim 1, wherein the phase is used to control the orientation and/or position of the first magnetic field component, and wherein the phase angle is increased by 90 electrical degrees between one pole and the same pole in an adjacent pair.

5. The method according to claim 1, wherein one or more eddy currents have a component which is parallel to the first plane, and wherein the maximum magnitude for the component for one or more or all of the eddy currents is parallel to the first plane.

6. The method according to claim 1, wherein the molten metal is aluminum including alloys thereof.

7. The method according to claim 1, wherein two pairs of magnetic poles are alongside one another.

8. The method according to claim 1, wherein the second direction is perpendicular to the first direction.

9. The method according to claim 8, wherein the electromagnetic inductor has a length extending in the second direction, wherein the Ampere forces are distributed throughout the container, the Ampere forces density being increased towards the container side facing the inductor; the Ampere forces being mainly parallel to the first plane; the Ampere forces being directed along the length of the electromagnetic inductor.

10. The method according to claim 1, wherein at least one pole pair has only one winding, and wherein this winding is one-phase winding.

11. The method according to claim 10, wherein the electromagnetic inductor comprises cores chosen between following cores: (a) C-shaped core; (b) I-shaped core; (c) L-shaped core.

12. The method according to claim 10, wherein the electromagnetic inductor comprises at least three pole pairs, wherein the controller is adapted to deliver following phase sequence to the said three pole pairs:
   a first phase from the phase sequence being equal to 0 electrical degrees;
   a second phase from the phase sequence being equal to 60 electrical degrees;
   a third phase from the phase sequence being equal to 120 electrical degrees,
      said phase sequence corresponding to an AYC scheme of connection.

13. The method according to claim 1, wherein it includes providing the electromagnetic pole pairs in different pairs at respective different angles relative to the first plane.

14. The method according to claim 1, wherein the container comprises an aluminum ingot having a side perpendicular to the first plane, wherein the molten metal is a liquid core, and wherein the electromagnetic inductor is installed along the side.

15. The method according to claim 14, wherein the container is a part of a continuous casting system, wherein the continuous casting system comprises a crystallizer, and wherein the method includes providing the crystallizer installed between the liquid core and the electromagnetic inductor.

16. The method according to claim 15, wherein at least one pole pair of the electromagnetic inductor has only one winding, and wherein this winding is one phase winding.

* * * * *